United States Patent
Makino et al.

(10) Patent No.: US 10,459,123 B2
(45) Date of Patent: Oct. 29, 2019

(54) OPTICAL MEMBER, IMAGE PICKUP APPARATUS, AND METHOD FOR MANUFACTURING OPTICAL MEMBER

(71) Applicant: CANON KABUSHIKI KAISHA, Tokyo (JP)

(72) Inventors: Kenji Makino, Kawasaki (JP); Tomonari Nakayama, Yokohama (JP); Yu Kameno, London (GB)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 15/913,655

(22) Filed: Mar. 6, 2018

(65) Prior Publication Data
US 2018/0259681 A1   Sep. 13, 2018

(30) Foreign Application Priority Data
Mar. 10, 2017 (JP) .................................. 2017-046633
Sep. 29, 2017 (JP) .................................. 2017-192061

(51) Int. Cl.
| G02B 1/111 | (2015.01) |
| C09D 127/12 | (2006.01) |
| C08K 5/10 | (2006.01) |
| C08L 1/14 | (2006.01) |
| C08J 5/18 | (2006.01) |
| G02B 27/00 | (2006.01) |
| G02B 1/115 | (2015.01) |

(52) U.S. Cl.
CPC ............... *G02B 1/111* (2013.01); *C08J 5/18* (2013.01); *C08K 5/10* (2013.01); *C08L 1/14* (2013.01); *C09D 127/12* (2013.01); *C08J 2301/10* (2013.01); *G02B 1/115* (2013.01); *G02B 27/0006* (2013.01); *G02B 2207/107* (2013.01)

(58) Field of Classification Search
CPC .. G02B 1/11; G02B 1/111; G02B 1/04; C08K 5/10; C08J 2301/10; C08J 5/18; C08L 1/14; H04N 5/2251; B32B 5/16
See application file for complete search history.

(56) References Cited

U.S. PATENT DOCUMENTS

| 10,234,600 | B2* | 3/2019 | Makino ................... G02B 1/04 |
| 2005/0195486 | A1 | 9/2005 | Sasaki |
| 2012/0189828 | A1 | 7/2012 | Inomata |
| 2016/0170094 | A1 | 6/2016 | Nakayama |
| 2017/0291392 | A1* | 10/2017 | Kawai ...................... B32B 5/16 |
| 2019/0116300 | A1* | 4/2019 | Okuno ................ H04N 5/2254 |

FOREIGN PATENT DOCUMENTS

| EP | 2644661 A | 10/2013 |
| JP | 2007-65522 A | 3/2007 |
| JP | 2010-217699 A | 9/2010 |
| JP | 2017-024385 A | 2/2017 |

* cited by examiner

*Primary Examiner* — William C. Dowling
(74) *Attorney, Agent, or Firm* — Canon U.S.A. Inc., IP Division (57) ABSTRACT

The optical member according to the present invention includes a film containing a plurality of chain particles and having a refractive index of 1.21 or more and 1.27 or less at a wavelength of 550 nm on a substrate. The film includes an alcohol having an ether bond or an ester bond and having a branched structure having 4 to 7 carbon atoms in a range of 1.0 mg/cm³ or more and 2.8 mg/cm³ or less.

20 Claims, 7 Drawing Sheets

| CROSS-SECTIONAL VIEW WITH 2.5 μm WIDTH (SCALE DOWN BY 25% IN WIDTH ONLY) | POSITION FROM SUBSTRATE (nm) | POROSITY (%) | NUMBER OF VOIDS (per μm) |
|---|---|---|---|
|  | 90 (AIR SIDE) | 4.6 | 4.3 |
|  | 80 | 12.4 | 4.4 |
|  | 70 | 10.1 | 5.5 |
|  | 60 | 12.8 | 6.8 |
|  | 50 | 15.2 | 6.7 |
|  | 40 | 16.4 | 7.7 |
|  | 30 | 21.7 | 8.2 |
|  | 20 | 18.3 | 6.2 |
|  | 10 (SUBSTRATE SIDE) | 15.0 | 1.5 |

| CROSS-SECTIONAL VIEW WITH 2.5 μm WIDTH (SCALE DOWN BY 25% IN WIDTH ONLY) | POSITION FROM SUBSTRATE (nm) | POROSITY (%) | NUMBER OF VOIDS (per μm) |
|---|---|---|---|
| | 80 | 3.2 | 0.5 |
| | 70 | 11.2 | 2.0 |
| | 60 | 21.3 | 4.3 |
| | 50 | 17.9 | 3.6 |
| | 40 | 7.5 | 1.3 |
| | 30 | 9.6 | 1.3 |
| | 20 | 20.4 | 3.2 |
| | 10 | 27.1 | 5.3 |

OPTICAL MEMBER, IMAGE PICKUP APPARATUS, AND METHOD FOR MANUFACTURING OPTICAL MEMBER

BACKGROUND OF THE INVENTION

Field of the Invention

The present invention relates to an optical member including an antireflection film containing particles and a method for manufacturing an optical member.

Description of the Related Art

In order to suppress reflection at the light incidence and emission interface of an optical member, it has been known to form an antireflection film, which is a monolayer or multilayer composed of optical films having different refractive indices and stacked to a thickness of several tens to several hundred nanometers. Such an antireflection film is formed by a vacuum film forming method, such vapor deposition and sputtering, or a wet film forming method, such as dip coating and spin coating.

It is known that the material of the outermost layer of the antireflection film is a transparent material having a low refractive index, for example, an inorganic material, such as silica, magnesium fluoride, and calcium fluoride, and an organic material, such as silicone resin and an amorphous fluororesin.

Japanese Patent Laid-Open No. 2007-65522 discloses an optical part including, on a base material, an antireflection film containing a silica reaction product obtained by hydrolysis and dehydration condensation of a silica mixture including chain silica, hydrolyzable group-containing silica, and water.

SUMMARY OF THE INVENTION

The optical member of the present invention includes a film containing a plurality of chain particles and having a refractive index of 1.21 or more and 1.27 or less at a wavelength of 550 nm on a substrate. The film includes an alcohol having an ether bond or an ester bond and having a branched structure having 4 to 7 carbon atoms in a range of 1.0 mg/cm$^3$ or more and 2.8 mg/cm$^3$ or less.

Furthermore, the method for manufacturing an optical member according to the present invention includes a step of supplying a dispersion liquid of chain particles dispersed in an alcohol having an ether bond or an ester bond and having a branched structure having 4 to 7 carbon atoms onto at least one surface of a substrate; and a step of drying and/or firing the dispersion liquid supplied on the substrate to form a film.

Further features of the present invention will become apparent from the following description of exemplary embodiments with reference to the attached drawings.

DESCRIPTION OF THE EMBODIMENTS

In the antireflection film produced by the manufacturing method of Japanese Patent Laid-Open No. 2007-65522, low refraction is achieved by means of voids formed by evaporation of a solvent in the coating film occurring during heat curing.

In Japanese Patent Laid-Open No. 2007-65522, in order to enhance the dispersibility of particles in a coating material for forming an antireflection film, a dispersant is added to the coating material. However, if the coating material for forming an antireflection film contains a dispersant, the voids in the resulting film are filled with the dispersant to prevent a reduction in the refractive index. If the size of voids is increased in order to reduce the refractive index, light scattering due to voids is increased, resulting in a difficulty in achievement of compatibility between low light scattering and a low refractive index.

In order to solve the above-described problems, the present invention achieves an antireflection film having a low refractive index and low light scattering by suppressing aggregation of particles without adding a dispersant and forming small size voids in the film.

The present invention will now be described in detail.

Optical Member

Figure 1:
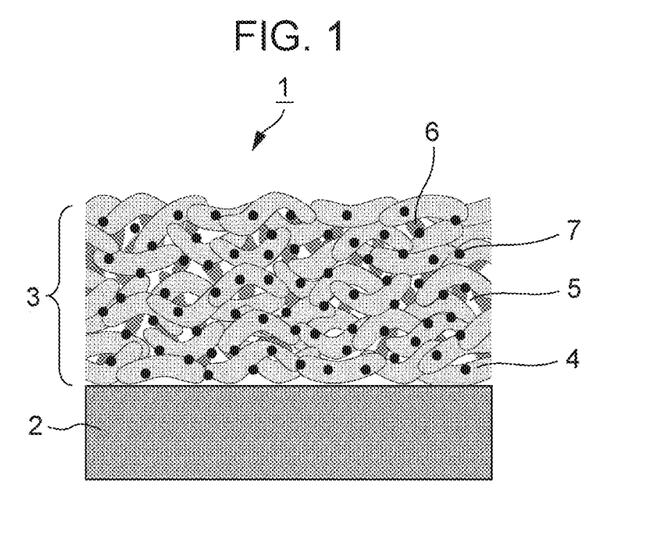
FIG. 1 is a schematic view illustrating an embodiment of the optical member of the present invention.

FIG. 1 is a schematic view illustrating an embodiment of the optical member of the present invention. The optical member 1 includes an antireflection film 3 containing a plurality of chain particles 4 on a substrate 2. The antireflection film 3 includes voids 5 between the chain particles 4, and the chain particles 4 are bound to one another by a binder 6. Herein, the term "chain particle" refers to a particle composed of a plurality of particles connected in a chain form.

Figure 3:
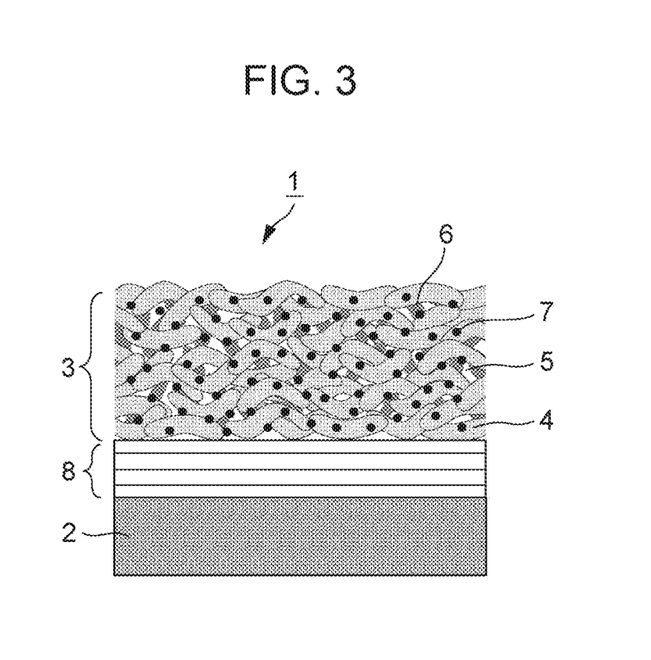
FIG. 3 is a schematic view illustrating another embodiment of the optical member of the present invention.

FIG. 3 is a schematic view illustrating another embodiment of the optical member 1 of the present invention. The optical member shown in FIG. 3 includes a laminated body 8 between a substrate 2 and an antireflection film 3 containing chain particles 4. The laminated body 8 is a film composed of a plurality of stacked layers having different refractive indices from each other. The structure shown in FIG. 3 can further reduce reflection compared to the structure shown in FIG. 1.

Since the voids 5 contain air (refractive index: 1.0), the antireflection film 3 can have a refractive index smaller than that of a film not containing voids 5. In order to reduce the refractive index of the antireflection film 3, it is desirable to increase the ratio of the voids 5 in the film. However, an excessive increase in the size of the voids 5 causes light scattering, resulting in unsuitability of the use of the antireflection film 3 in an optical member. The cross-sectional area of the void 5 is preferably 1000 nm$^2$ or less and more preferably 500 nm$^2$ or less.

In order to achieve an optical member having a low refractive index and low scattering, it is necessary to dispose an antireflection film 3, in which a large number of small voids 5 not causing scattering are distributed, on a substrate 2. In order to reduce the scattering of the antireflection film 3 containing chain particles 4, it is necessary to reduce the size of the voids 5 formed between chain particles 4.

Figure 2:
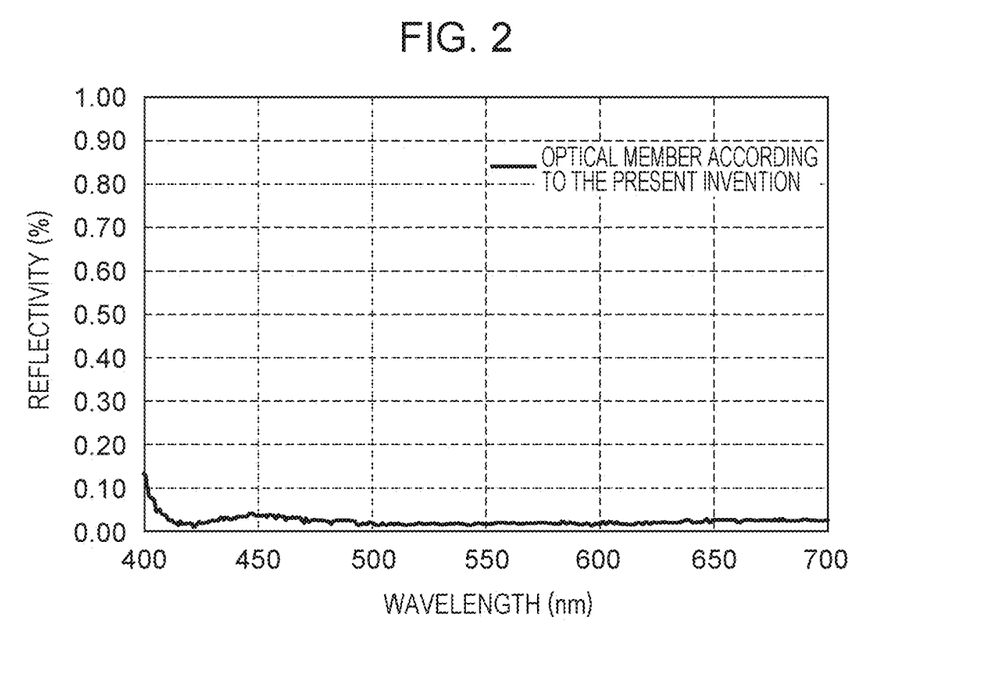
FIG. 2 is a graph showing a relationship between the light wavelength and the relative reflectivity of an optical member according to the present invention.

The present inventors have diligently studied and, as a result, have found that the void size in a film containing chain particles 4 can be controlled by coordinating alcohol 7 having an ether bond or an ester bond and having a branched structure having 4 to 7 carbon atoms with the chain particles 4. Coordination of an alcohol having an ether bond or an ester bond and having a branched structure having 4 to 7 carbon atoms with the surfaces of the chain particles 4 appropriately widens the voids 5 between particles in the antireflection film 3 composed of chain particles 4, resulting in achievement of an optical member having low refraction and also low scattering. FIG. 2 is a graph showing a relationship between the light wavelength (nm) and the relative reflectivity (%) of an optical member having the structure shown in FIG. 3 according to the present invention and demonstrates that a significantly excellent antireflection effect is exhibited over a broad wavelength range.

The reasons for obtaining such an effect will now be considered. The "alcohol 7 having an ether bond or an ester bond and having a branched structure having 4 to 7 carbon atoms" may be referred to below as "C4-7 branched structure alcohol 7" for simplification.

The antireflection film 3 containing chain particles 4 is formed by supplying a dispersion liquid containing a component necessary for forming a binder 6, chain particles, and a solvent to a substrate 2 and drying and/or firing the dispersion liquid. In the use of chain particles 4 having a large number of hydroxyl groups on the surfaces, the solvent coordinates with the hydroxyl groups on the surfaces of the chain particles in the dispersion liquid to enhance the dispersibility of the chain particles, leading to unnecessity of addition of a dispersant. The solvent coordinated with the chain particle surfaces can keep the state of being coordinated with the surfaces even after drying and/or firing. Accordingly, the size of voids can be maintained.

In order to enhance the strength of the antireflection film, the chain particles in the film can be bound to one another by a binder at portions adjacent to each other. The binder can utilize a siloxane bond, in particular, when the chain particles have a large number of hydroxyl groups on the surfaces, in particular, when silica is used as the chain particles. If the solvent is coordinated with all the hydroxyl groups on the surfaces of the chain particles 4 having a large number of hydroxyl groups on the surfaces, a siloxane bond cannot be formed. Also from this viewpoint, it is known that the solvent can be an alcohol having an ether bond or an ester bond and having a branched structure having 4 to 7 carbon atoms. The reason of this is probably that the steric hindrance by the branched structure of a C4-7 branched structure alcohol suppresses the coordination of the solvent with the hydroxyl groups on the chain particle surfaces to reserve a part of the hydroxyl groups on the chain particle surfaces.

As described above, the C4-7 branched structure alcohol coordinated with the chain particles acts as a spacer widening the voids between chain particles. In particular, since the chain particles have an irregularly bent structure, the effect of widening the voids can be probably enhanced by allowing the C4-7 branched structure alcohol to be present near the portions at which the particles bind to each other.

In order to reduce the refractive index, that is, in order to increase the ratio of voids present in the film, it is presumed that a longer chain length of the C4-7 branched structure alcohol acting as a spacer is better. However, an increase in the chain length increases the boiling point of the solvent, leading to necessity of high drying and/or firing temperature for evaporating the solvent not coordinated with the particles. The substrate on which a film is formed is damaged depending on the quality of the material by the high temperature to cause, for example, deformation and discoloration. Accordingly, a solvent having a low boiling point can be used. However, a solvent having a boiling point of lower than 90° C. suddenly evaporates during the drying and/or firing to generate voids of 1000 nm$^2$ or more, resulting in an increase in scattering.

The number of carbon atoms of the alcohol having an ether bond or an ester bond and having a branched structure can be appropriately selected according to the heat resistant temperature of the substrate, but a solvent having a boiling point of 100° C. or more can be used considering the heat resistant temperature of the substrate that is widely used in optical members. Accordingly, the number of carbon atoms of the C4-7 branched structure alcohol can be four to seven. In addition, if the antireflection film has irregularities, poor appearance, such as interference fringes, is observed. Since the boiling point increases with an increase in the number of carbon atoms contained in the alcohol, an alcohol having a large number of carbon atoms can slow the drying of the dispersion liquid during application and thereby can prevent occurrence of irregularities of the film. Accordingly, a solvent having a higher boiling point to some extent can be used, and the number of carbon atoms of the C4-7 branched structure alcohol can be five or six.

Furthermore, the effect of widening the voids varies also depending on the structure of the ether bond or the ester bond. Although the details of the mechanism thereof are not clear, an optical member being low in light scattering can be obtained by using an alcohol having a structure containing an ether bond or an ester bond. It probably caused by that the effect of the spacer is enhanced by a hydrogen bond between the unshared electron pair of oxygen contained in the ether bond or ester bond and the hydroxyl group on the chain particle surface.

Examples of the alcohol having an ether bond or an ester bond and having a branched structure having 4 to 7 carbon atoms include 1-methoxy-2-propanol, 1-ethoxy-2-propanol, 1-propoxy-2-propanol, 1-butoxy-2-propanol, 2-isopropoxyethanol, 3-methoxy-1-butanol, methyl lactate, and ethyl lactate. These alcohols having an ether bond or an ester bond and having a branched structure having 4 to 7 carbon atoms may be used alone or in combination of two or more thereof.

The amount of the C4-7 branched structure alcohol in the film can be 1.0 mg/cm$^3$ or more and 2.8 mg/cm$^3$ or less. If the amount is less than 1.0 mg/cm$^3$, the density of the voids present in the film is low to increase the refractive index. In contrast, if the amount is higher than 2.8 mg/cm$^3$, the refractive index of the film may not be lowered due to the refractive index of the solvent itself, and the difference between the refractive indices of the solvent and the voids contained in the film may cause light scattering.

As described above, according to the present invention, it is possible to achieve an optical member including an antireflection film causing less light scattering and having a refractive index of 1.21 or more and 1.27 or less at a wavelength of 550 nm. The optical member of the present invention can be used in, for example, an optical film, lens, or prism.

Each component of the optical member 1 will now be described in detail.

Substrate

As the substrate 2, for example, plastic, glass, and resin can be used. The substrate 2 may have any shape and may be in a flat, curved, concave, convex, or film shape.

Antireflection Film

The antireflection film 3 includes chain particles 4 accumulated on the surface of the substrate 2, and the particles 4 are bound to one another by a binder 6. The refractive index of the antireflection film 3 is lower than that of the chain particle 4 itself, due to the air (refractive index: 1.0) contained in the voids 5. The void 5 may be a single hole or may be a continuous hole.

The thickness of the antireflection film 3 containing the chain particles 4 can be 80 nm or more and 200 nm or less. By designing the thickness of the layer within this range, the reflectivity in the visible region can be reduced in both cases that the antireflection film is a monolayer containing the chain particles 4 and that the antireflection film is a multilayer composed of a layer containing the chain particles 4 and another layer.

Particles

The chain particles 4 can have an average minor axis of 10 nm or more and 50 nm or less and an average major axis of 60 nm or more and 200 nm or less. The minor axis is approximately equivalent to the diameter of one of particles connected to each other and constituting a chain particle. If the minor axis is shorter than 10 nm, the void between the chain particles 4 is small, resulting in an insufficient reduction in refractive index. If the major axis is shorter than 60 nm, the function of widening the void between particles by the alcohol having an ether bond or an ester bond and having a branched structure having 4 to 7 carbon atoms coordinated with the surfaces of the chain particles is not sufficiently exhibited.

If the minor axis is longer than 50 nm, light scattering due to the large size of the particles tends to occur. If the major axis is longer than 100 nm, since the size of the voids between the chain particles increases, large voids tend to disadvantageously occur.

Herein, the average diameter of the chain particles is average Feret's diameter. The average Feret's diameter can be measured by processing an image obtained with a transmission electron microscope. The image can be processed with a commercially available image processing software, such as image-Pro PLUS (manufactured by Media Cybernetics). In a predetermined region of the image, the contrast is appropriately adjusted as necessary, the average Feret's diameter of each particle is measured by particle measurement, and the average value is calculated.

In a solution in which the chain particles are dispersed in a solvent, the averages of the minor axes and the major axes can be determined by dynamic light scattering measurement.

The chain particle can be composed of connected solid particles of a metal oxide or organic resin, such as silicon dioxide, magnesium fluoride, fluororesin, and silicone. Among these particles, a chain particle composed of solid particles of silicon dioxide can be used due to easiness in manufacturing.

The content of the chain particle in the antireflection film is desirably 40 vol % or more and 60 vol % or less.

Binder

The binder 6 can be a material that forms a siloxane bond between chain particles to bind the particles. The binder 6 may be used by mixing a solution containing a component necessary for forming a binder consisting of a silane-alkoxy hydrolysis condensate with a solution in which the chain particles are dispersed in a solvent. Alternatively, a solution containing a component necessary for forming a binder may be applied after application of a solution in which the chain particles are dispersed in a solvent and alignment of the particles.

The solution containing a component necessary for forming a binder can be a solution containing a silane-alkoxy hydrolysis condensate. The solution containing a silane-alkoxy hydrolysis condensate can be produced by reacting an alkoxysilane and water with stirring to hydrolyze the alkoxysilane and generate a silane-alkoxy hydrolysis condensate.

Since the alkoxysilane, a precursor of the silane-alkoxy hydrolysis condensate, is not compatible with water, the mixture of alkoxysilane and water forms a two-layer separation state in the initial stage of the reaction. With progress of the reaction, the alkoxide is silanolized to increase hydrophilic groups, and the hydrolysis product of the alkoxysilane is dissolved in the water layer to cancel the two-layer separation state and form a uniform mixture. The amount of water to be mixed with the alkoxysilane can be 5 to 20 equivalents of the alkoxysilane. In order to enhance the hydrolysis, an acid or base may be added as a catalyst. The catalyst can contain one or more acids or bases selected from the group consisting of sulfuric acid, hydrochloric acid, nitric acid, phosphoric acid, ammonia, phosphinic acid, and phosphonic acid and can be used at a concentration of 1 wt % or less. In the binder to be mixed with the chain particles, the temperature of the solution in which the silane-alkoxy hydrolysis condensate generated by hydrolysis of the alkoxysilane and water are uniformly mixed can be higher than 5° C. and not higher than 30° C. If the solution temperature is 5° C. or less, it takes too much time for the hydrolysis, resulting in poor productivity of the silane-alkoxy hydrolysis condensate. In contrast, if the solution temperature is higher than 30° C., the condensation reaction proceeds, and the silane-alkoxy hydrolysis condensate grows too much, disadvantageously resulting in increases in scattering by the silane-alkoxy hydrolysis condensate and in scattering due to an increase in the size of the voids formed between the chain particles.

The degree of progress of the hydrolysis and condensation reaction of the silane-alkoxy hydrolysis condensate can be evaluated by the average particle diameter. The silane-alkoxy hydrolysis condensate can have an average particle diameter of 8 to 30 nm when the solution containing a component necessary for forming a binder is measured by a dynamic light scattering method. The silane-alkoxy hydrolysis condensate more preferably has an average particle diameter of 8 to 15 nm.

The alkoxysilane may be a trifunctional silane modified with a methyl group, such as methyltriethoxysilane and methyltrimethoxysilane; a tetrafunctional silane, such as tetraethoxysilane; or a mixture of the trifunctional silane and the tetrafunctional silane. An increase in the number of silanol groups increases the probability of forming a siloxane bond at the contact points of particles and enhances the strength of the antireflection film. Accordingly, tetrafunctional silane can be advantageously used.

Other Layer

In order to further enhance the antireflection effect of the optical member 1, as shown in FIG. 3, the optical member 1 can include a laminated body 8 composed of stacked layers of materials having different refractive indices from each other, such as a combination of a high refractive index layer and a moderate refractive index layer, between the antireflection film 3 and the substrate 2. As a result, reflection can be further reduced by means of the interference in the laminated body 8. The high refractive index layer can be a layer containing zirconium oxide, titanium oxide, tantalum oxide, niobium oxide, or hafnium oxide. The moderate refractive index layer can be a layer containing alumina, silicon oxide, or magnesium fluoride.

Furthermore, the surface of the antireflection film 3 may be provided with a function, such as water repellency and oil repellency. For example, a coating material containing fluorine or a silicone coating material is applied to the surface.

In the formation of the layers constituting the laminated body 8 and the addition of a function to the surface of the antireflection film 3, a known method, such as a vacuum evaporation method, a sputtering method, a CVD method, a dip coating method, a spin coating method, and a spray coating method, can be used.

Method for Manufacturing Optical Member

An example of a method for manufacturing an optical member according to the present invention will be described.

In the method for manufacturing an optical member of the present invention, a solution containing a component necessary for forming a binder 6 and a dispersion liquid containing chain particles and a solvent are supplied onto a substrate 2. The dispersion liquid is then dried to form a single layer in which the chain particles 4 are bound to one another by the binder 6.

In order to, for example, enhance the coating properties by reducing the viscosity of the dispersion liquid, another solvent may be mixed, in addition to the alcohol having an ether bond or an ester bond and having a branched structure having 4 to 7 carbon atoms (C4-7 branched structure alcohol) according to the present invention. For example, ethyl cellosolve, methyl cellosolve, 2-ethylbutanol, or cyclopentanone may be mixed in a range of 5 wt % or more and 30 wt % or less of the dispersion liquid.

Step of Applying Dispersion Liquid Containing Chain Particles

As described above, the chain particles 4 mixed with the dispersion liquid can have an average minor axis of 10 nm or more and 50 nm or less and an average major axis of 60 nm or more and 200 nm or less. Examples of such chain particles include Snowtex-OUP and Snowtex-UP (registered trademark), IPA-ST-UP (registered trademark), and MEK-ST-UP (registered trademark) manufactured by Nissan Chemical Industries, Ltd. These silica gels have irregularly bent shapes. These silica gels are used by replacing the solvent with the C4-7 branched structure alcohol or by being diluted with the C4-7 branched structure alcohol. When the boiling point of the solvent of the silica gel is 90° C. or less, the silica gel is used by replacing the solvent with the C4-7 branched structure alcohol to prevent sudden evaporation of the solvent.

The concentration of the chain particles in the dispersion liquid including the particles may be adjusted so as to give an intended content in the film according to the thickness necessary as an antireflection film and can be appropriately selected depending on the solvent and film-forming conditions and can be 3 wt % or more and 20 wt % or less in terms of an oxide. If the concentration is 3 wt % or less, it is required to repeat coating for obtaining a desired thickness. If the concentration is higher than 20 wt %, the particles are apt to aggregate.

The dispersion liquid containing chain particles may contain a component necessary for forming a binder for imparting strength to the antireflection film. The concentration of the component necessary for forming a binder can be appropriately selected depending on the concentration of the chain particles and can be 0.2 wt % or more and less than 1.5 wt % for providing an appropriate strength as an antireflection film. The concentration is more preferably 0.2 wt % or more and 1.0 wt % or less. A concentration of less than 0.2 wt % is insufficient for binding particles to give a film having a reduced strength. In contrast, if the concentration is 1.5 wt % or more, the amount of the component necessary for forming a binder in the particle film is excessive, the voids are filled with the binder, and the refractive index is increased, resulting in a reduction of the antireflection effect. Furthermore, the component necessary for forming a binder widens the voids between particles to increase the light scattering.

The dispersion liquid containing chain particles can be applied to the surface of a substrate by a known method, such as a dip coating method, a spin coating method, a spray coating method, a slit coating method, and a printing method.

Step of Producing Antireflection Film

The solution is applied to form a single coating film and is then dried. The drying can be performed with, for example, a dryer, a hot plate, or an electric furnace. The drying is performed at a temperature and for a period of time that do not affect the substrate and can evaporate the solvent not coordinated with the chain particles in the particle film. In general, the temperature can be 300° C. or less.

EXAMPLES

The present invention will now be more specifically described by examples, but is not limited to the following Examples.

A dispersion liquid containing chain particles and a solvent and a solution containing a component necessary for forming a binder (hereinafter, referred to as binder solution) were respectively prepared by the following methods.

(a) Preparation of Dispersion Liquid Containing Particle Dispersion Liquid 1

The solvent, 2-propanol, of an IPA dispersion liquid of chain particles composed of connected silica solid particles was replaced with 1-propoxy-2-propanol (manufactured by Sigma) using an evaporator to prepare a 1-propoxy-2-propanol dispersion liquid of the chain particles (solid concentration: 17 wt %). The IPA dispersion liquid of chain particles used was IPA-ST-UP (registered trademark) manufactured by Nissan Chemical Industries, Ltd. having a particle diameter of 40 to 100 nm determined by a dynamic light scattering method and a solid concentration of 15 wt %. The ratio between the solvents, 2-propanol (not having an ether bond and an ester bond, number of carbon atoms: 3) and 1-propoxy-2-propanol (having an ether bond or an ester bond, number of carbon atoms: 6), was 7.5:92.5.

Tetraethoxysilane (TEOS, 18.5 g) and 0.1 wt % phosphinic acid (16.0 g, 10 equivalents of the TEOS) serving as catalyst water were mixed by stirring in a water bath of 20° C. for 60 minutes to produce a binder solution 1. The tetraethoxysilane, which is also called TEOS or ethyl silicate, used was that manufactured by Tokyo Chemical Industry Co., Ltd.

The binder solution 1 (32.8 g), which is equivalent to an amount of the component necessary for forming a binder of 0.5 wt % in terms of an oxide, was added to a 1-propoxy-2-propanol dispersion liquid (251.3 g) of chain particles. 1-Propoxy-2-propanol (174.5 g) and ethyl lactate (546.5 g) were then added to the solution to adjust the solid concentration of the chain particles to 4.3 wt % in terms of an oxide, followed by stirring for 60 minutes to obtain a dispersion liquid 1 in which the weight ratio between 1-propoxy-2-propanol and ethyl lactate (having an ether bond or an ester bond, number of carbon atoms: 5) was 40:60.

Dispersion Liquid 2

A dispersion liquid 2 was prepared as in dispersion liquid 1 except that 13.1 g of the binder solution 1, which is equivalent to an amount of the component necessary for forming a binder of 0.2 wt % in terms of an oxide, was added to the 1-propoxy-2-propanol dispersion liquid (251.3 g) of chain particles.

Dispersion Liquid 3

A dispersion liquid 3 was prepared as in dispersion liquid 1 except that 45.6 g of the binder solution 1, which is equivalent to an amount of the component necessary for forming a binder of 0.7 wt % in terms of an oxide, was added to the 1-propoxy-2-propanol dispersion liquid (251.3 g) of chain particles.

Dispersion Liquid 4

A dispersion liquid 4 was prepared as in dispersion liquid 1 except that 1-propoxy-2-propanol (669.2 g) and ethyl lactate (19.7 g) were added to adjust the solid concentration of the chain particles to 4.3 wt % in terms of an oxide and the solution was stirred for 60 minutes and that the weight ratio between 1-propoxy-2-propanol and ethyl lactate was adjusted to 95:5.

Dispersion Liquid 5

A dispersion liquid 5 was prepared as in dispersion liquid 1 except that 1-Propoxy-2-propanol (29.3 g) and ethyl lactate (689.5 g) were added to adjust the solid concentration of the chain particles to 4.3 wt % in terms of an oxide and the solution was stirred for 60 minutes and that the weight ratio between 1-propoxy-2-propanol and ethyl lactate was adjusted to 25:75.

Dispersion Liquid 6

A dispersion liquid 6 was prepared as in dispersion liquid 1 except that a 1-propoxy-2-propanol dispersion liquid of chain particles (solid concentration: 25 wt %, 172.0 g) was used and that 1-propoxy-2-propanol (62.4 g) and methyl lactate (737.4 g) were added to adjust the solid concentration of the chain particles to 4.3 wt % in terms of an oxide and the solution was stirred for 60 minutes and that the weight ratio between 1-propoxy-2-propanol and methyl lactate (number of carbon atoms: 4) was adjusted to 20:80.

Dispersion Liquid 7

A dispersion liquid 7 was prepared as in dispersion liquid 6 except that 1-ethoxy-2-propanol was used instead of methyl lactate and that the weight ratio between 1-propoxy-2-propanol and 1-ethoxy-2-propanol (having an ether bond or an ester bond, number of carbon atoms: 5) was adjusted to 20:80.

Dispersion Liquid 8

A dispersion liquid 8 was prepared as in dispersion liquid 6 except that 2-isopropoxyethanol was used instead of methyl lactate and that the weight ratio between 1-propoxy-2-propanol and 2-isopropoxyethanol (having an ether bond or an ester bond, number of carbon atoms: 5) was adjusted to 20:80.

Dispersion Liquid 9

A dispersion liquid 9 was prepared as in dispersion liquid 6 except that 3-methoxy-1-butanol was used instead of methyl lactate and that the weight ratio between 1-propoxy-2-propanol and 3-methoxy-1-butanol (having an ether bond or an ester bond, number of carbon atoms: 5) was adjusted to 20:80.

Dispersion Liquid 10

A dispersion liquid 10 was prepared as in dispersion liquid 1 except that the component necessary for forming a binder was not added to the 1-propoxy-2-propanol dispersion liquid (251.3 g) of chain particles.

Dispersion Liquid 11

A dispersion liquid 11 was prepared as in dispersion liquid 1 except that 98.7 g of the binder solution 1, which is equivalent to an amount of the component necessary for forming a binder of 1.5 wt % in terms of an oxide, was added to the 1-propoxy-2-propanol dispersion liquid (251.3 g) of chain particles.

Dispersion Liquid 12

A dispersion liquid 12 was prepared as in dispersion liquid 6 except that 2-methoxyethanol was used instead of methyl lactate and that the weight ratio between 1-propoxy-2-propanol and 2-methoxyethanol (not having an ether bond and an ester bond, number of carbon atoms: 3) was adjusted to 20:80.

Dispersion Liquid 13

A dispersion liquid 13 was prepared as in dispersion liquid 6 except that 2-ethoxyethanol was used instead of methyl lactate and that the weight ratio between 1-propoxy-2-propanol and 2-ethoxyethanol (not having an ether bond and an ester bond, number of carbon atoms: 4) was adjusted to 20:80.

Dispersion Liquid 14

A dispersion liquid 14 was prepared as in dispersion liquid 6 except that 1-pentanol was used instead of methyl lactate and that the weight ratio between 1-propoxy-2-propanol and 1-pentanol (not having an ether bond and an ester bond, number of carbon atoms: 5) was adjusted to 20:80.

Dispersion Liquid 15

A dispersion liquid 15 was prepared as in dispersion liquid 6 except that 2-heptanone was used instead of methyl lactate and that the weight ratio between 1-propoxy-2-propanol and 2-heptanone (not having an ether bond and an ester bond, number of carbon atoms: 7) was adjusted to 20:80.

Dispersion Liquid 16

A dispersion liquid 16 was prepared as in dispersion liquid 6 except that cyclohexanone was used instead of methyl lactate and that the weight ratio between 1-propoxy-2-propanol and cyclohexanone was adjusted to 20:80.

Dispersion Liquid 17

A dispersion liquid 17 was prepared as in dispersion liquid 1 except that an IPA dispersion liquid of hollow silica slurry was used without performing solvent replacement with the evaporator and that the weight ratio of 2-propanol was adjusted to 100. The hollow silica slurry IPA dispersion liquid used was Sluria 1110 having an average Feret's diameter of 50 nm and a solid concentration of 20.5 wt % manufactured by JGC Catalysts and Chemicals Ltd.

Dispersion Liquid 18

A dispersion liquid 18 was prepared as in dispersion liquid 1 except that an IPA dispersion liquid of chain particles composed of connected solid particles of silica was used without performing solvent replacement with the evaporator and that the weight ratio of 2-propanol was adjusted to 100.

(b) Preparation of Binder Solution 2

Tetraethoxysilane (TEOS, manufactured by Tokyo Chemical Industry Co., Ltd., 26.0 g) and 0.1 wt % phosphinic acid (22.5 g, 10 equivalents of the TEOS) serving as catalyst water were added to 1-ethoxy-2-propanol (manufactured by Kishida Chemical Co., Ltd., 7.7 g). The mixture was stirred for 60 minutes and was then further stirred in an oil bath of 60° C. for 40 minutes to prepare a binder solution 2. 1-Ethoxy-2-propanol and 2-ethylbutanol were then added to the binder solution 2 to give a final silica solid concentration of 0.8 wt %. The ratio of 1-ethoxy-2-propanol to 2-ethylbutanol in the binder solution was adjusted to 3/7.

Optical members according to the following Examples and Comparative Examples were produced using the above-described dispersion liquids and binder solutions.

Example 1

The dispersion liquid 1 (0.2 mL) composed of particles and dispersion media was dropped onto a silicon substrate of 4 cm×4 cm, followed by spin coating at 4000 rpm for 20 seconds. The silicon substrate was fired in a hot air circulating oven of 25° C. for 12 hours to produce an optical member having a thickness of 98 nm.

Figure 4:
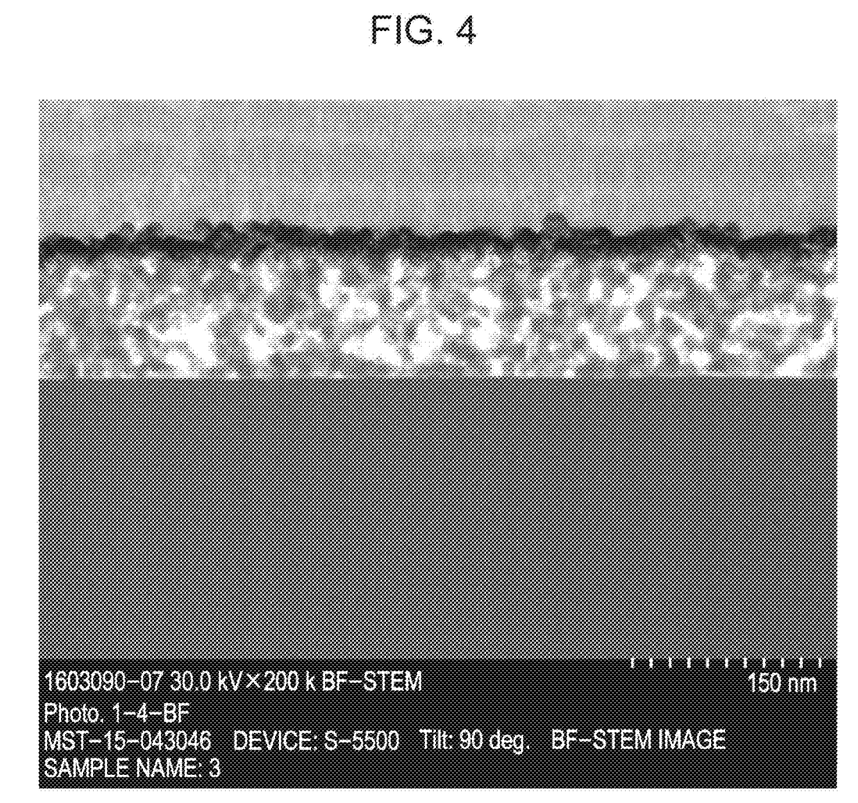
FIG. 4 is a scanning transmission electron microscope photograph of the optical member of Example 1.

FIG. 4 is a scanning transmission electron microscope photograph of the optical member provided with a particle film of Example 1. It was observed that a particle film of accumulated chain particles was formed and that voids (white portions in FIG. 4) were distributed throughout the film.

Example 2

An optical member was produced as in Example 1 except that the silicon substrate coated with the dispersion liquid 1 was fired in a hot air circulating oven of 25° C. for 10 minutes.

Example 3

An optical member was produced as in Example 1 except that the silicon substrate coated with the dispersion liquid 1 was fired in a hot air circulating oven of 140° C. for 30 minutes.

Example 4

An optical member was produced as in Example 1 except that the silicon substrate coated with the dispersion liquid 1 was fired in a hot air circulating oven of 140° C. for 60 minutes.

Example 5

An optical member was produced as in Example 1 except that the silicon substrate coated with the dispersion liquid 1 was fired in a hot air circulating oven of 200° C. for 60 minutes.

Example 6

An optical member was produced as in Example 1 except that the dispersion liquid 10 instead of the dispersion liquid 1 was applied onto a silicon substrate and that the silicon substrate coated with the dispersion liquid 10 was fired in a hot air circulating oven of 140° C. for 30 minutes.

Example 7

An optical member was produced as in Example 1 except that the dispersion liquid 2 instead of the dispersion liquid 1 was applied onto a silicon substrate and that the silicon substrate coated with the dispersion liquid 2 was fired in a hot air circulating oven of 140° C. for 30 minutes.

Example 8

An optical member was produced as in Example 1 except that the dispersion liquid 3 instead of the dispersion liquid 1 was applied onto a silicon substrate and that the silicon substrate coated with the dispersion liquid 3 was fired in a hot air circulating oven of 140° C. for 30 minutes.

Example 9

An optical member was produced as in Example 1 except that the dispersion liquid 4 instead of the dispersion liquid 1 was applied onto a silicon substrate and that the silicon substrate coated with the dispersion liquid 4 was fired in a hot air circulating oven of 140° C. for 30 minutes.

Example 10

An optical member was produced as in Example 1 except that the dispersion liquid 5 instead of the dispersion liquid 1 was applied onto a silicon substrate and that the silicon substrate coated with the dispersion liquid 5 was fired in a hot air circulating oven of 140° C. for 30 minutes.

Example 11

An optical member was produced as in Example 1 except that the dispersion liquid 6 instead of the dispersion liquid 1 was applied onto a silicon substrate and that the silicon substrate coated with the dispersion liquid 6 was fired in a hot air circulating oven of 140° C. for 30 minutes.

Example 12

An optical member was produced as in Example 1 except that the dispersion liquid 7 instead of the dispersion liquid 1 was applied onto a silicon substrate and that the silicon substrate coated with the dispersion liquid 7 was fired in a hot air circulating oven of 140° C. for 30 minutes.

Example 13

An optical member was produced as in Example 1 except that the dispersion liquid 8 instead of the dispersion liquid 1 was applied onto a silicon substrate and that the silicon substrate coated with the dispersion liquid 8 was fired in a hot air circulating oven of 140° C. for 30 minutes.

Example 14

An optical member was produced as in Example 1 except that the dispersion liquid 9 instead of the dispersion liquid 1 was applied onto a silicon substrate and that the silicon substrate coated with the dispersion liquid 9 was fired in a hot air circulating oven of 140° C. for 30 minutes.

Example 15

The dispersion liquid 10 (0.2 mL) composed of particles and dispersion media was dropped onto a silicon substrate of 4 cm×4 cm as in Example 1, followed by spin coating at 4000 rpm for 20 seconds. The binder solution 2 (0.2 mL) was then dropped thereon, followed by spin coating at 4000 rpm for 20 seconds. The silicon substrate was fired in a hot air circulating oven of 140° C. for 30 minutes to produce an optical member.

Comparative Example 1

An optical member was produced as in Example 1 except that a silicon substrate coated with the dispersion liquid 1 was fired in a hot air circulating oven of 300° C. for 60 minutes.

Comparative Example 2

An optical member was produced as in Example 1 except that a silicon substrate coated with the dispersion liquid 1 was fired in a hot air circulating oven of 200° C. for 180 minutes.

Comparative Example 3

An optical member was produced as in Example 1 except that the dispersion liquid 11 instead of the dispersion liquid 1 was applied onto a silicon substrate and that the silicon substrate coated with the dispersion liquid 11 was fired in a hot air circulating oven of 140° C. for 30 minutes.

Comparative Example 4

An optical member was produced as in Example 1 except that the dispersion liquid 12 instead of the dispersion liquid 1 was applied onto a silicon substrate and that the silicon substrate coated with the dispersion liquid 12 was fired in a hot air circulating oven of 140° C. for 30 minutes.

Comparative Example 5

An optical member was produced as in Example 1 except that the dispersion liquid 13 instead of the dispersion liquid 1 was applied onto a silicon substrate and that the silicon substrate coated with the dispersion liquid 13 was fired in a hot air circulating oven of 140° C. for 30 minutes.

Comparative Example 6

An optical member was produced as in Example 1 except that the dispersion liquid 14 instead of the dispersion liquid 1 was applied onto a silicon substrate and that the silicon substrate coated with the dispersion liquid 14 was fired in a hot air circulating oven of 140° C. for 30 minutes.

Comparative Example 7

An optical member was produced as in Example 1 except that the dispersion liquid 15 instead of the dispersion liquid 1 was applied onto a silicon substrate and that the silicon substrate coated with the dispersion liquid 15 was fired in a hot air circulating oven of 140° C. for 30 minutes.

Comparative Example 8

An optical member was produced as in Example 1 except that the dispersion liquid 16 instead of the dispersion liquid 1 was applied onto a silicon substrate and that the silicon substrate coated with the dispersion liquid 16 was fired in a hot air circulating oven of 140° C. for 30 minutes.

Comparative Example 9

An optical member was produced as in Example 1 except that the dispersion liquid 17 instead of the dispersion liquid 1 was applied onto a silicon substrate and that the silicon substrate coated with the dispersion liquid 17 was fired in a hot air circulating oven of 120° C. for 30 minutes.

Comparative Example 10

An optical member was produced as in Example 1 except that the dispersion liquid 18 instead of the dispersion liquid 1 was applied onto a silicon substrate and that the silicon substrate coated with the dispersion liquid 18 was fired in a hot air circulating oven of 120° C. for 30 minutes.
Evaluation of Optical Member
The optical members prepared in Examples and Comparative Examples above were evaluated by the following methods.
(1) Remaining Solvent Amount
An optical member including an antireflection film formed on a silicon substrate of 4 cm×4 cm was formed, and the amount of the solvent contained in the antireflection film was measured using headspace TriPlus 300, mass spectrograph LSQ LT, and gas chromatograph TRAC GC ULTRA manufactured by Thermo Fisher Scientific and UltraAlloy series columns (model: UA+−5) manufactured by Frontier Laboratories Ltd.
The measurement conditions were as follows:
Headspace oven heating temperature: 160° C.,
Equilibrium time: 30 minutes,
Purge time: 3 minutes,
Mass spectrograph ion source temperature: 220° C.,
Gas chromatograph inlet heating temperature: 200° C., and
Oven heating conditions:
Holding at 40° C. for 1 minute in the initial stage,
Increasing the temperature to 200° C. at a rate of 5.0° C./min and holding 200° C. for 10 minutes, and
Increasing the temperature to 320° C. at a rate of 20.0° C./min and holding 320° C. for 5 minutes.
An optical member produced in Example and a chloroform solution containing 0.15 wt % of naphthalene as an internal standard were enclosed in a 10-mL sample tube, followed by measurement. From the thickness of the antireflection film of the optical member and the area of the silicon substrate, the remaining solvent amount per cubic centimeter of the film was calculated. The substrate is not limited to a silicon substrate, and the measurement is possible regardless of the shape and the type of the vitreous material.
The remaining solvent amount was calculated based on a standard curve of a solvent. The standard curve was formed by adding a solvent to be detected to a chloroform solution containing 0.15 wt % of naphthalene to give amounts of 0.13 wt %, 0.23 wt %, 0.35 wt %, and 0.62 wt % of the chloroform solution including 0.15 wt % of naphthalene.

(2) Measurement of Film Thickness and Refractive Index

The film thickness and refractive index of the optical member including an antireflection film formed on a silicon substrate were measured by spectroscopic ellipsometry (J.A. Woollam EC-400).

(3) Measurement of Minute Light Scattering Value

A 150-W halogen fiber light system (PHL-150C) was used as a light source. The light emitted by the halogen fiber light system was allowed to pass through a rod homogenizer (RHO-13S-E2) to adjust the illuminance to 4000 xl with an iris diaphragm. The light was allowed to incident on an optical member at an angle of 45°, and the measurement sample was photographed from the front with a camera equipped with a camera lens at a shutter speed of 10 seconds, an aperture of F10, and ISO 400. The measurement sample was disposed such that the face on which the antireflection film was formed faced the light source side. The camera lens used was Compact-Macro Lens EF 50 mm, and the camera used was Canon EOS40D.

The resulting image was analyzed by general image processing software (Adobe Photo Shop). Pixels (700 pixels by 700 pixels) were quantitatively measured, and the brightness was expressed by a natural number.

(4) Measurement of Indentation Strength

An optical member including an antireflection film formed on a flat glass substrate having a diameter of 30 mm (S-BSL7, nd=1.52, manufactured by Ohara Inc.) was produced. An indenter was pressed against the antireflection film perpendicularly to the surface of the antireflection film, and the indentation strength was measured. The indentation strength was measured with a nanoindenter (NANO G200, manufactured by Nano Instruments Ltd.). The conditions for measuring the indentation strength are as follows:

Measurement mode: DCM mode,
Surface approach distance: 1000 nm,
Surface approach velocity: 10 nm/s,
Surface detect stiffness criteria: 200 N/m,
Depth limit: 250 nm,
Stain rate target: 0.05 1/S,
Harmonic displacement target: 1 nm, and
Poisson's ratio: 0.25.

(5) Measurement of Number of Voids and Porosity

The number of voids and porosity of the optical members of Examples 1 and 3 and Comparative Examples 9 and 10 were also measured. The antireflection film formed on a substrate was coated with a carbon film and a Pt—Pd film and was sliced into thin pieces in an electron beam processing apparatus (FIB-SEM: Nova 600 manufactured by FEI Company), followed by observation with a scanning transmission electron microscope (STEM: S-5500 manufactured by Hitachi, Ltd.).

A dark-field image of a cross-section was processed with image-Pro PLUS (manufactured by Media Cybernetics).

The particle film was divided every 10 nm into regions parallel to the substrate, and the regions were numbered from the substrate side, such as region 1. Contrast adjustment was appropriately performed for each region to binarize the voids and the particles. An arbitrary range having a length of 2.5 µm was extracted from each region. The number of voids and the porosity per 5 µm in each of the extracted ranges were calculated as the number of voids and the porosity contained in each region divided every 10 nm in parallel to the substrate. Herein, a range having a length of 2.5 µm was extracted from each region and was used for the calculation, but the range may have a length of at least 2 µm in total. For example, the average of two extracted ranges each having a length of 1 µm may be calculated.

When one void spreads to a plurality of ranges, the ratio of the area of the void present in a range for calculating the number of voids to the total area of the void was used as the number. Specifically, when a void P has a cross-sectional area of M and the area of the void P contained in a range S for calculating the number of voids is N, the number of the void P contained in the range S is defined as N/M. The numbers calculated by this method are summed in each divided region, and the total number is defined as the number of voids in the region.

Regarding the porosity, the ratio of the total area of the voids contained in a region for calculating the porosity to the total area of the region is calculated as the porosity of the region.

Since the surface of the substrate is coated with a carbon film and a Pt—Pd film, the voids are filled with the films, and the original porosity cannot be measured. Accordingly, the region within 15 nm from the surface of the substrate was excluded from the measurement.

The results of the evaluations (1) to (4) for the optical members produced in Examples 1 to 15 and Comparative Examples 1 to 10 are shown in Table 1.

The numerical values and evaluation criteria shown in the table are as follows:

Remaining solvent amount: amount of solvent remaining in film measured by GC-MS;
Binder amount: mass percent concentration of component necessary for forming binder in dispersion liquid;
Indentation strength evaluation: evaluation results A to C mean acceptable optical member,
A: 0.70 GPa or more,
B: 0.65 GPa or more and less than 0.70 GPa,
C: 0.60 GPa or more and less than 0.65 GPa, and
D: less than 0.60 GPa; and
Minute light scattering evaluation: evaluation results A to C mean acceptable optical member,
A: less than 26,
B: 26 or more and less than 28,
C: 28 or more and less than 30, and
D: 30 or more.

TABLE 1

| | Dispersion liquid | Solvent | Firing conditions | Refractive index |
|---|---|---|---|---|
| Example 1 | Dispersion liquid 1 | 1-propoxy-2-propanol:ethyl lactate = 40:60 | 25° C., 12 hours | 1.2378 |
| Example 2 | Dispersion liquid 1 | 1-propoxy-2-propanol:ethyl lactate = 40:60 | 25° C., 10 minutes | 1.2376 |
| Example 3 | Dispersion liquid 1 | 1-propoxy-2-propanol:ethyl lactate = 40:60 | 140° C., 30 minutes | 1.2371 |
| Example 4 | Dispersion liquid 1 | 1-propoxy-2-propanol:ethyl lactate = 40:60 | 140° C., 60 minutes | 1.2364 |
| Example 5 | Dispersion liquid 1 | 1-propoxy-2-propanol:ethyl lactate = 40:60 | 200° C., 60 minutes | 1.2368 |
| Example 6 | Dispersion liquid 10 | 1-propoxy-2-propanol:ethyl lactate = 40:60 | 140° C., 30 minutes | 1.2048 |
| Example 7 | Dispersion liquid 2 | 1-propoxy-2-propanol:ethyl lactate = 40:60 | 140° C., 30 minutes | 1.2200 |
| Example 8 | Dispersion liquid 3 | 1-propoxy-2-propanol:ethyl lactate = 40:60 | 140° C., 30 minutes | 1.2413 |
| Example 9 | Dispersion liquid 4 | 1-propoxy-2-propanol:ethyl lactate = 95:5 | 140° C., 30 minutes | 1.2239 |

TABLE 1-continued

| | | | | |
|---|---|---|---|---|
| Example 10 | Dispersion liquid 5 | 1-propoxy-2-propanol:ethyl lactate = 25:75 | 140° C., 30 minutes | 1.2365 |
| Example 11 | Dispersion liquid 6 | 1-propoxy-2-propanol:methyl lactate = 20:80 | 140° C., 30 minutes | 1.2417 |
| Example 12 | Dispersion liquid 7 | 1-propoxy-2-propanol:1-ethoxy-2-propanol = 20:80 | 140° C., 30 minutes | 1.2298 |
| Example 13 | Dispersion liquid 8 | 1-propoxy-2-propanol:2-isopropoxyethanol = 20:80 | 140° C., 30 minutes | 1.2239 |
| Example 14 | Dispersion liquid 9 | 1-propoxy-2-propanol:3-methoxy-1-butanol = 20:80 | 140° C., 30 minutes | 1.2405 |
| Example 15 | Dispersion liquid 10 and binder 2 | 1-propoxy-2-propanol:ethyl lactate = 40:60 | 140° C., 30 minutes | 1.2679 |
| Comparative Example 1 | Dispersion liquid 1 | 1-propoxy-2-propanol:ethyl lactate = 40:60 | 300° C., 60 minutes | 1.2343 |
| Comparative Example 2 | Dispersion liquid 1 | 1-propoxy-2-propanol:ethyl lactate = 40:60 | 200° C., 180 minutes | 1.2374 |
| Comparative Example 3 | Dispersion liquid 11 | 1-propoxy-2-propanol:ethyl lactate = 40:60 | 140° C., 30 minutes | 1.2735 |
| Comparative Example 4 | Dispersion liquid 12 | 1-propoxy-2-propanol:2-methoxyethanol = 20:80 | 140° C., 30 minutes | 1.2101 |
| Comparative Example 5 | Dispersion liquid 13 | 1-propoxy-2-propanol:2-ethoxyethanol = 20:80 | 140° C., 30 minutes | 1.2353 |
| Comparative Example 6 | Dispersion liquid 14 | 1-propoxy-2-propanol:1-pentanol = 20:80 | 140° C., 30 minutes | 1.2124 |
| Comparative Example 7 | Dispersion liquid 15 | 1-propoxy-2-propanol:2-heptanone = 20:80 | 140° C., 30 minutes | 1.2141 |
| Comparative Example 8 | Dispersion liquid 16 | 1-propoxy-2-propanol:cyclohexanone = 20:80 | 140° C., 30 minutes | 1.2110 |
| Comparative Example 9 | Dispersion liquid 17 | IPA | 120° C., 30 minutes | 1.2423 |
| Comparative Example 10 | Dispersion liquid 18 | IPA | 120° C., 30 minutes | 1.2450 |

| | Remaining solvent amount (mg/cm$^3$) | Binder amount (wt %) | Indentation strength (GPa) | Minute light scattering value | Indentation strength evaluation | Minute light scattering evaluation |
|---|---|---|---|---|---|---|
| Example 1 | 2.4 | 0.5 | 0.68 | 22 | B | A |
| Example 2 | 2.8 | 0.5 | 0.64 | 29 | D | C |
| Example 3 | 2.2 | 0.5 | 0.69 | 28 | B | C |
| Example 4 | 1.3 | 0.5 | 0.72 | 26 | A | B |
| Example 5 | 1.0 | 0.5 | 0.63 | 27 | C | B |
| Example 6 | 1.7 | 0 | 0.42 | 17 | D | A |
| Example 7 | 1.9 | 0.2 | 0.67 | 20 | B | A |
| Example 8 | 1.8 | 0.7 | 0.74 | 28 | A | C |
| Example 9 | 2.0 | 0.5 | 0.72 | 28 | A | C |
| Example 10 | 2.1 | 0.5 | 0.80 | 25 | A | A |
| Example 11 | 1.8 | 0.5 | 0.65 | 23 | B | A |
| Example 12 | 1.2 | 0.5 | 0.60 | 24 | C | A |
| Example 13 | 1.3 | 0.5 | 0.62 | 26 | C | B |
| Example 14 | 1.0 | 0.5 | 0.83 | 27 | A | B |
| Example 15 | 2.3 | — | 0.82 | 22 | A | A |
| Comparative Example 1 | 0 | 0.5 | 0.82 | 32 | A | D |
| Comparative Example 2 | 0.8 | 0.5 | 0.80 | 30 | A | D |
| Comparative Example 3 | 1.5 | 1.5 | 0.82 | 56 | A | D |
| Comparative Example 4 | 0 | 0.5 | 0.60 | 63 | C | D |
| Comparative Example 5 | 0 | 0.5 | 0.61 | 30 | C | D |
| Comparative Example 6 | 0 | 0.5 | 0.67 | 48 | B | D |
| Comparative Example 7 | 0 | 0.5 | 0.62 | 32 | C | D |
| Comparative Example 8 | 0 | 0.5 | 0.67 | 46 | B | D |
| Comparative Example 9 | 0 | 0.5 | 0.62 | 36 | C | D |
| Comparative Example 10 | 0 | 0.5 | 0.64 | 33 | C | D |

The results shown in Table 1 demonstrate the followings.

The amount of the solvent remaining in the film varies depending on the firing conditions. The remaining solvent amount decreases with an increase in the temperature and with an increase in the firing time. When the content of the C4-7 branched structure alcohol having an ether bond or an ester bond per unit volume of a film is 1.0 mg/cm$^3$ or more and 2.8 mg/cm$^3$ or less, the film can have a small refractive index and a low minute light scattering value. As in Comparative Examples 4 to 10, even if the solvent includes a C4-7 branched structure alcohol when a film is formed, minute light scattering cannot be prevented if the alcohol does not remain in the formed film. Herein, the content of a C4-7 branched structure alcohol having an ether bond or an ester bond per unit volume of a film is synonymous with "Remaining solvent amount" in Table 1.

As can be seen from Comparative Examples 1 and 2, high temperature treatment or long heat treatment time enhances the indentation strength, but also increases the minute light scattering value. This is probably caused by that the solvent evaporates to widen the voids between the particles, whereas the binding between the component necessary for forming a binder and the particles progresses to form a strong bond. The results of Examples 6 to 8 and Comparative Example 3 demonstrate that the refractive index and the indentation strength increase with an increase in the binder amount. However, as in Comparative Example 3, a large amount of the binder in a dispersion liquid enhances the indentation strength of the resulting film, but also increases the refractive index and the minute light scattering value, resulting in impossibility of acquisition of performance suitable as an optical member. This is conjectured that aggregate of the component necessary for forming a binder in a dispersion liquid is formed and that the aggregate binds between chain particles to further increase the size of voids.

The results of Examples 9 and 10 demonstrate that excellent optical characteristics can be achieved if the content of the alcohol having an ether bond or an ester bond and having a branched structure having 4 to 7 carbon atoms is 1.0 mg/cm$^3$ or more and 2.8 mg/cm$^3$ or less, even if the mixing ratio of the solvents is changed.

Furthermore, the results of Example 15 demonstrate that even in a manufacturing method by forming a film containing chain particles without adding a binder to the dispersion liquid and then applying a solution containing a component for forming a binder, the optical member can acquire sufficient performance. However, the film formed using a dispersion liquid containing a binder also had a high refractive index. This is probably caused by that the component for forming the binder permeates a part of the voids when the dispersion liquid is applied.

Table 2 shows the results of measurement of the number of voids and the porosity of optical members in Examples 1 and 3 and Comparative Examples 9 and 10 and also shows data of the reflectivity and the minute light scattering.

Figure 5A:
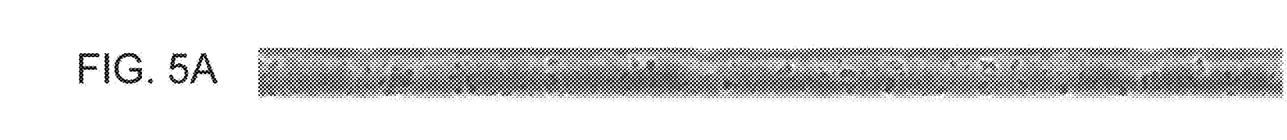
FIG. 5A is an electron microscope photograph of a cross-section of the antireflection film of Example 1.
Figures 5B, 5C:
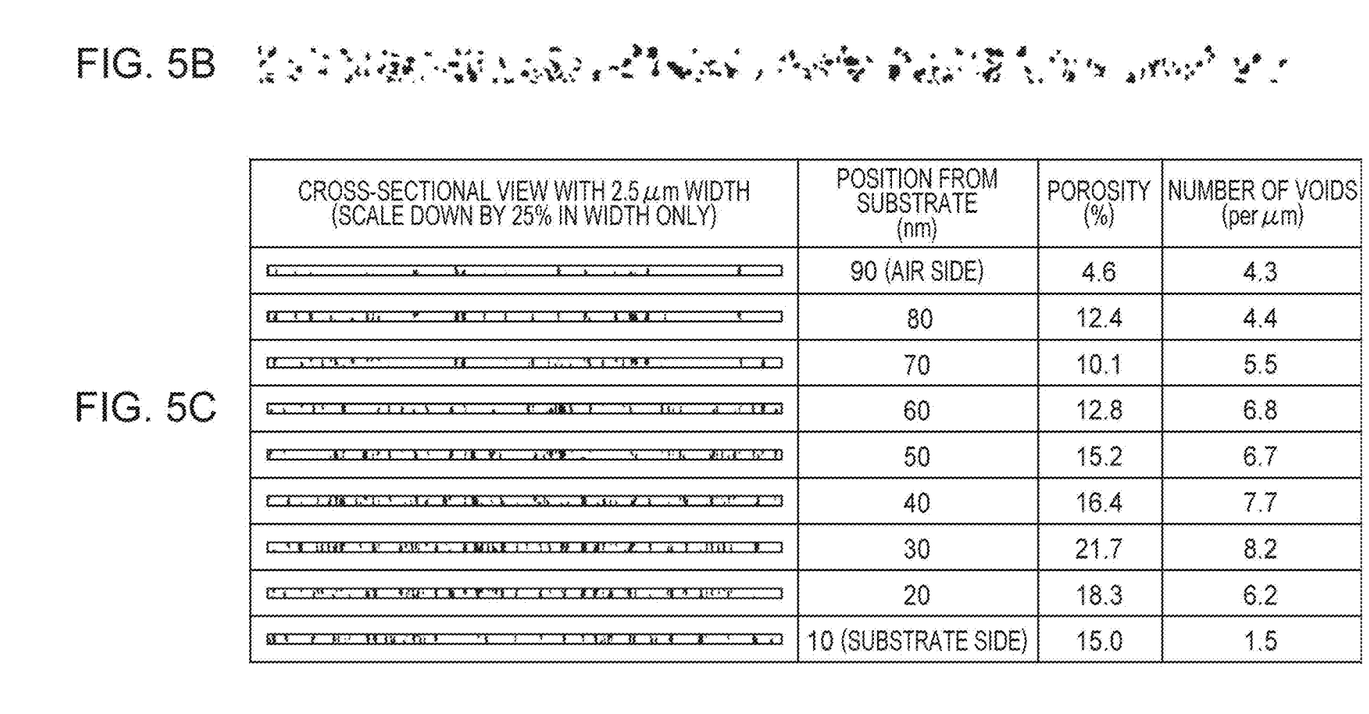
FIG. 5B is a binarized image of the photograph in FIG. 5A.
FIG. 5C shows the calculation results of the number of voids and the porosity in each region of the image in FIG. 5B divided in parallel to the substrate.
Figure 6A:
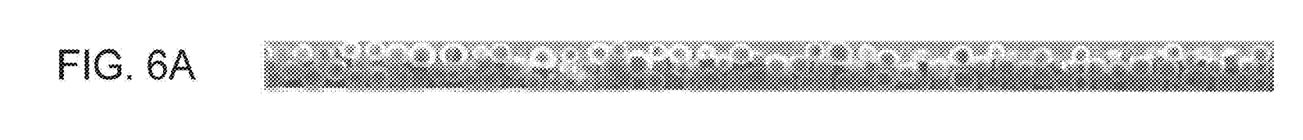
FIG. 6A is an electron microscope photograph of a cross-section of the antireflection film of Comparative Example 9.
Figure 6B:
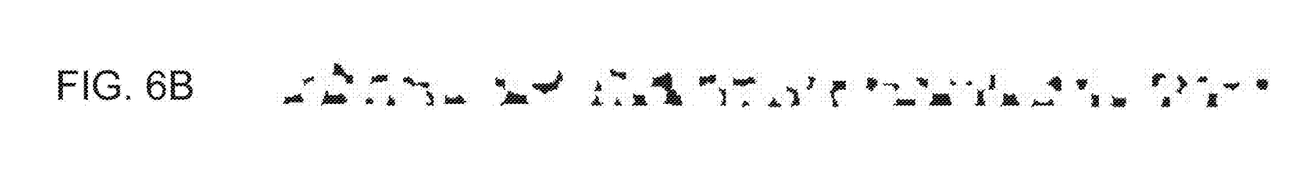
FIG. 6B is a binarized image of the photograph in FIG. 6A.
Figure 6C:
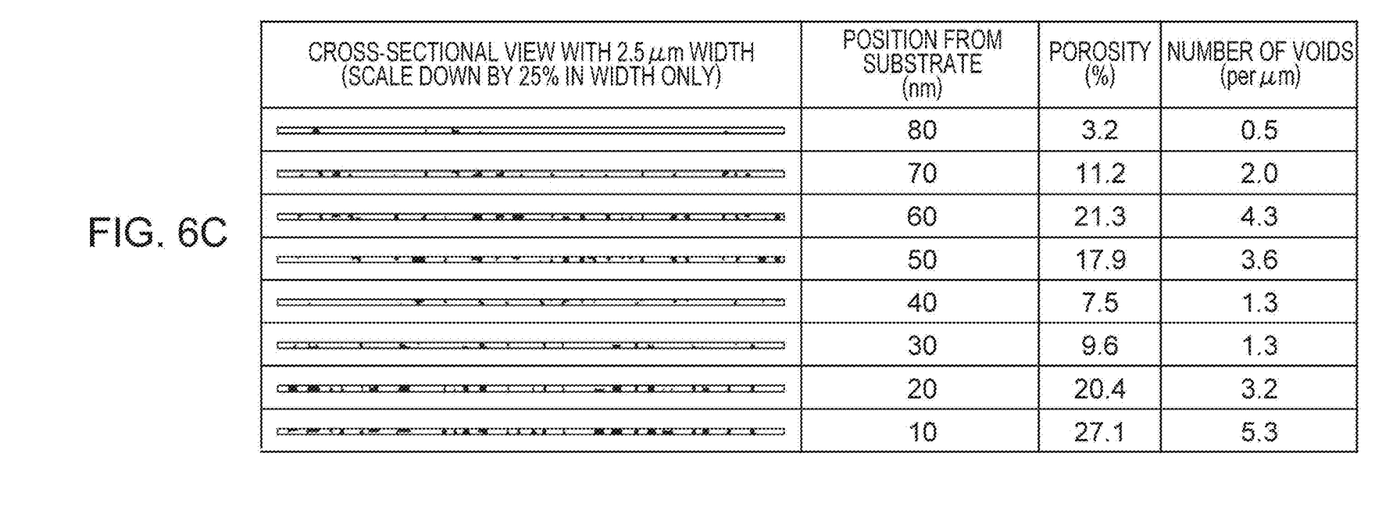
FIG. 6C shows the calculation results of the number of voids and the porosity in each region of the image in FIG. 6B divided in parallel to the substrate.
Figure 7A:
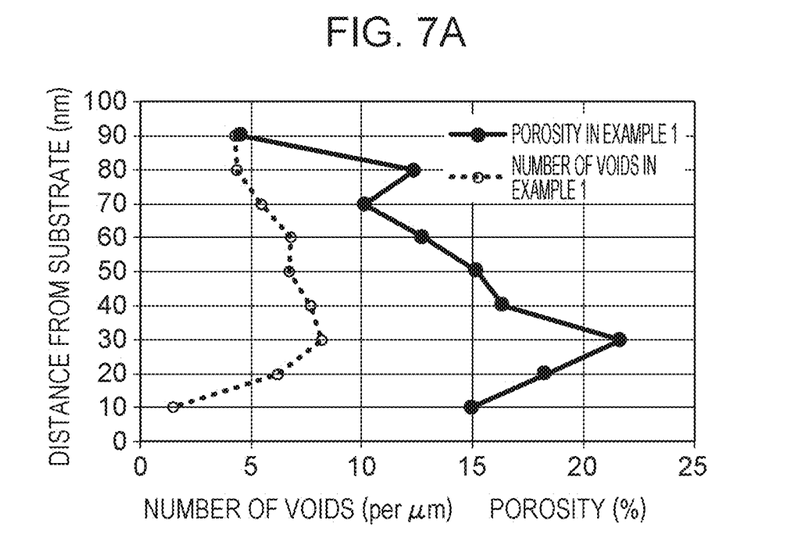
FIGS. 7A and 7B are graphs showing a relationship between the porosity or the number of voids and the position in the thickness direction of the antireflection films of Example 1 and Comparative Example 9, respectively.
Figure 7B:
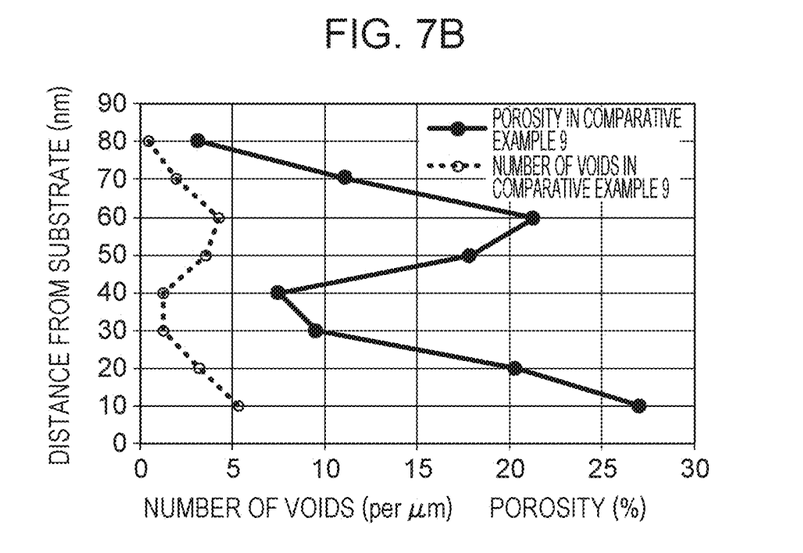

FIG. 5A is an electron microscope photograph at 50000 magnification of a cross-section of the antireflection film used in the measurement of the number of voids and the porosity; FIG. 5B is a binarized image of the photograph in FIG. 5A; and FIG. 5C shows the calculation results for each region of the image in FIG. 5B divided in parallel to the substrate. FIGS. 6A, 6B, and 6C, corresponding to FIGS. 5A, 5B, and 5C respectively, show the results in Comparative Example 9. FIGS. 7A and 7B show relationships between the film thickness direction and the number of voids and between the film thickness direction and the porosity in Example 1 and Comparative Example 9, respectively.

which the measured value is the maximum among the values that are each larger than the values at the respective anteroposterior positions.

In contrast, in Comparative Example 9 shown in FIG. 7B, the number of voids was less than five per micrometer of the film thickness over the entire film. Furthermore, the porosity is equal to or higher than that in Example 1. It was therefore demonstrated that relatively large voids were present in the region having high porosity. The evaluation result of the minute light scattering shown in Table 2 was D, which also suggests that the presence of such large voids caused an increase in light scattering. It was presumed that the large voids were formed by sudden evaporation of the solvent having a low boiling point.

In the film according to the present invention, as shown in the data of the number of voids and the porosity, the number of voids near the surface of the substrate is small, and the size of the voids is also small. Such a structure is expected to prevent infiltration of a contaminant into the inside of the film, even if an oil film or the like adheres to the surface, to exhibit an excellent antifouling effect. Accordingly, samples produced as in Example 1 or 2 or Comparative Example 9

TABLE 2

| | Dispersion liquid | Solvent | Firing conditions | Average thickness of particle film (nm) | | Region 1 | Region 2 | Region 3 | Region 4 |
|---|---|---|---|---|---|---|---|---|---|
| Example 1 | Dispersion liquid 1 | 1-propoxy-2-propanol:ethyl lactate = 40:60 | 25° C., 12 hr | 98 | Number of voids | 1.5 | 6.2 | 8.2 | 7.7 |
| | | | | | Porosity (%) | 15.0 | 18.3 | 21.7 | 16.4 |
| Example 3 | Dispersion liquid 1 | 1-propoxy-2-propanol:ethyl lactate = 40:60 | 140° C., 30 min | 105 | Number of voids | 2.5 | 2.8 | 3.0 | 2.6 |
| | | | | | Porosity (%) | 3.2 | 8.2 | 19 | 7.0 |
| Comparative Example 9 | Dispersion liquid 17 | IPA = 100 | 120° C., 30 min | 85 | Number of voids | 5.3 | 3.2 | 1.3 | 1.3 |
| | | | | | Porosity (%) | 27.1 | 20.4 | 9.6 | 7.5 |
| Comparative Example 10 | Dispersion liquid 18 | IPA = 100 | 120° C., 30 min | 107 | Number of voids | 0 | 0.4 | 1.2 | 2.8 |
| | | | | | Porosity (%) | 0 | 0.1 | 10.2 | 23.4 |

| | Region 5 | Region 6 | Region 7 | Region 8 | Region 9 | Region 10 | Reflectivity change (%) | Minute light scattering evaluation |
|---|---|---|---|---|---|---|---|---|
| Example 1 | 6.2 | 6.8 | 5.5 | 4.4 | 4.3 | — | 0.07 | A |
| | 15.2 | 12.8 | 10.1 | 12.4 | 4.6 | — | | |
| Example 3 | 2.3 | 2.0 | 1.5 | 1.4 | 1.3 | 0.5 | 0.09 | C |
| | 5.2 | 3.0 | 2.2 | 1.8 | 1.5 | 1.0 | | |
| Comparative Example 9 | 3.6 | 4.3 | 2.0 | 0.5 | — | — | 0.33 | D |
| | 17.9 | 21.3 | 11.2 | 3.2 | — | — | | |
| Comparative Example 10 | 1.6 | 1.6 | 0.4 | 2.4 | 12.8 | 14.1 | 0.20 | D |
| | 11.8 | 8.1 | 1.6 | 7.1 | 22.3 | 14.2 | | |

FIGS. 7A and 7B show that the voids were distributed in the film thickness direction in both samples. In Example 1 shown in FIG. 7A, the number of voids was five or more per micrometer of the film thickness in almost every region. The maximum peaks of the number of voids and the porosity were both present in the region of 30 nm from the substrate, which is less than half of the film thickness from the substrate side of the film, and also both maximum peaks were present in the same region. In addition, the porosity level decreased from the maximum peak toward the opposite side of the film to the substrate. The data of Table 2 demonstrate that the distribution of the number of voids and the porosity in Example 3 were the same as that in Example 1. The term "maximum peak" herein refers to the position at or 10 were subjected to measurement of the change in reflectivity between the initial stage and after adhesion of oil.

Figure 8A:
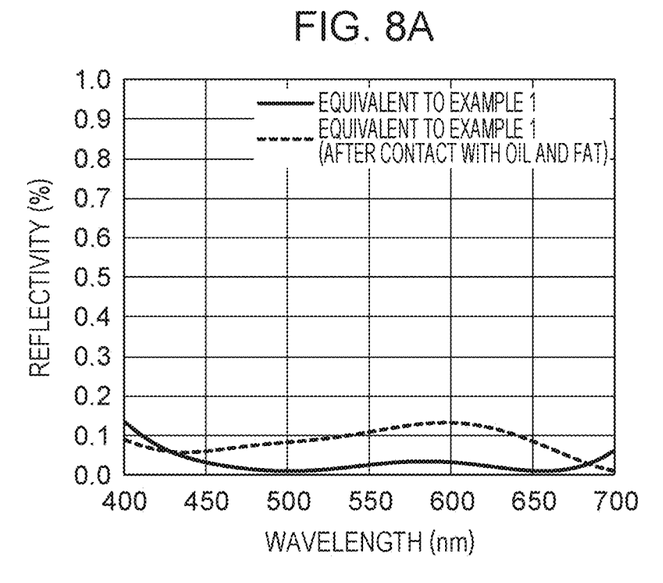
FIGS. 8A and 8B are graphs showing a relationship between the light wavelength and the relative reflectivity of each of the optical members equivalent to Example 1 and Comparative Example 9, respectively.
Figure 8B:
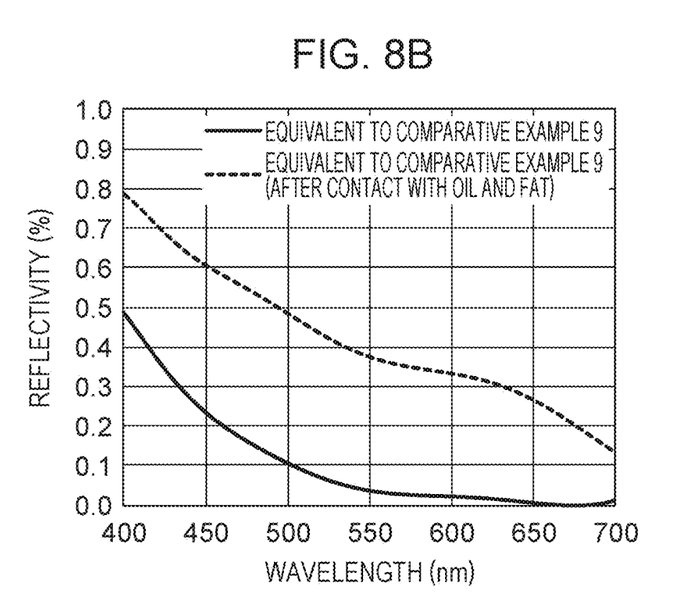

As the reflectivity at the initial stage, the reflectivities in a wavelength range of 400 to 700 nm were measured with a lens reflectivity measurement device (USPM-RU, manufactured by Olympus Corporation), and the average of the reflectivities (average reflectivity) in a wavelength range of 450 to 650 nm was determined. Subsequently, in order to make an oil-contaminated state on the film, 5 μL of hexadecane was applied to the film, and the average reflectivity was determined as in the measurement of that at the initial stage. The change in reflectivity was determined from the difference in the reflectivity between before and after the adhesion of hexadecane. The results of Examples 1 and 2 and Comparative Examples 9 and 10 are shown in the respective rows of Table 2. FIG. 8A is a graph showing a relationship between the light wavelength and the relative reflectivity in a sample equivalent to Example 1, and FIG. 8B is a graph showing a relationship between the light wavelength and the relative reflectivity in a sample equivalent to Comparative Example 9. These graphs and Table 2 demonstrate that in both samples equivalent to Comparative Examples 9 and 10, the change in average reflectivity after adhesion of oil was larger than 0.1%. In contrast, it was demonstrated that in samples equivalent to Examples 1 and 2, the change in average reflectivity after adhesion of oil was suppressed to 0.1% or less, excellent antifouling performance was achieved.

The optical member produced by the present invention can correspond to a transparent substrate having an arbitrary refractive index, shows an excellent antireflection effect against visible light, and has long-term weather resistance. Accordingly, for example, the optical member can be used as the optical member of a variety of displays of, for example, a word processor, a computer, a TV, and a plasma display panel; can be used as the optical member of the polarizing plate of a liquid crystal display and in a sunglass lens or prescription glass lens made of an optical vitreous material or transparent plastic; and can be used as the optical member of the finder lens, prism, fly eye lens, and toric lens of an image pickup apparatus and as the optical member of a variety of optical filters and sensors. Furthermore, for example, the optical member can be used in various types of optical lenses of a photographing optical system including the above-mentioned optical member, an observation optical system such as binoculars, a projection optical system used in a liquid crystal projector, and a scanning optical system in a laser beam printer; and also can be used in the cover of various meters. Furthermore, the optical member can be used as the optical member of the window glass of an automobile, a train, and so on.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-046633, filed Mar. 10, 2017 and No. 2017-192061, filed Sep. 29, 2017, which are hereby incorporated by reference herein in their entirety.

What is claimed is:

1. An optical member comprising:
a substrate; and
a film containing a plurality of chain particles and having a refractive index of 1.20 or more and 1.27 or less at a wavelength of 550 nm, on the substrate, wherein
the film includes an alcohol having an ether bond or an ester bond and having a branched structure having 4 to 7 carbon atoms in an amount within a range of 1.0 mg/cm$^3$ or more and 2.8 mg/cm$^3$ or less.

2. The optical member according to claim 1, wherein the alcohol is any one of 1-propoxy-2-propanol, 1-ethoxy-2-propanol, 2-isopropoxyethanol, and 3-methoxy-1-butanol.

3. The optical member according to claim 1, wherein the chain particles are composed of silicon dioxide.

4. The optical member according to claim 1, wherein the chain particles have a minor axis of 10 nm or more and 50 nm or less and a major axis of 60 nm or more and 200 nm or less.

5. The optical member according to claim 1, wherein the film includes voids between the chain particles.

6. The optical member according to claim 1, wherein the chain particles are bound to one another by a binder at contact points of the particles.

7. The optical member according to claim 6, wherein the binder includes a siloxane bond.

8. The optical member according to claim 1, wherein the film has a thickness of 80 nm or more and 200 nm or less.

9. The optical member according to claim 1, wherein at least one maximum peak of porosity is present in the film less than half of the film thickness from the substrate side of the film, the porosity level decreases from the maximum peak in a direction away from the substrate, and the maximum peak of porosity and a maximum peak of the number of voids appear at substantially the same position in the film thickness direction.

10. The optical member according to claim 1 further comprising:
a laminated body composed of stacked layers of materials having different refractive indices from each other between the substrate and the film.

11. The optical member according to claim 10, wherein the laminated body is composed of a combination of a material selected from the group consisting of zirconium oxide, titanium oxide, tantalum oxide, niobium oxide, and hafnium oxide and a material selected from the group consisting of alumina, silicon oxide, and magnesium fluoride.

12. An image pickup apparatus having a photographing optical system comprising an optical member according to claim 1.

13. A method for manufacturing an optical member, comprising:
applying a dispersion liquid of chain particles dispersed in an alcohol having an ether bond or an ester bond and having a branched structure having 4 to 7 carbon atoms onto at least one surface of a substrate; and
drying and/or firing the dispersion liquid applied on the substrate to form a film.

14. The method for manufacturing an optical member according to claim 13, wherein
the dispersion liquid includes a binder that forms a siloxane bond between the particles.

15. The method for manufacturing an optical member according to claim 14, wherein
the dispersion liquid includes the binder in an amount of 0.2 wt % or more and less than 1.5 wt %.

16. The method for manufacturing an optical member according to claim 14, wherein
the dispersion liquid is prepared by mixing a solution for forming the binder obtained by mixing and reacting an alkoxysilane with water containing a catalyst and a solution obtained by dispersing the chain particles in the alcohol.

17. The method for manufacturing an optical member according to claim 16, wherein
the alkoxysilane is ethyl silicate.

18. The method for manufacturing an optical member according to claim 16, wherein the catalyst includes one or more acids selected from the group consisting of phosphoric acid, phosphinic acid, and phosphonic acid.

19. The method for manufacturing an optical member according to claim 13, wherein the dispersion liquid supplied on the substrate is applied onto at least one surface of the substrate by spin coating.

20. The method for manufacturing an optical member according to claim 13, wherein the chain particles have a minor axis of 10 nm or more and 50 nm or less and a major axis of 60 nm or more and 200 nm or less.

\* \* \* \* \*